R. H. BRANFIELD.
ENGINE MOUNTING.
APPLICATION FILED NOV. 6, 1915.
1,188,242.
Patented June 20, 1916.
2 SHEETS—SHEET 1.
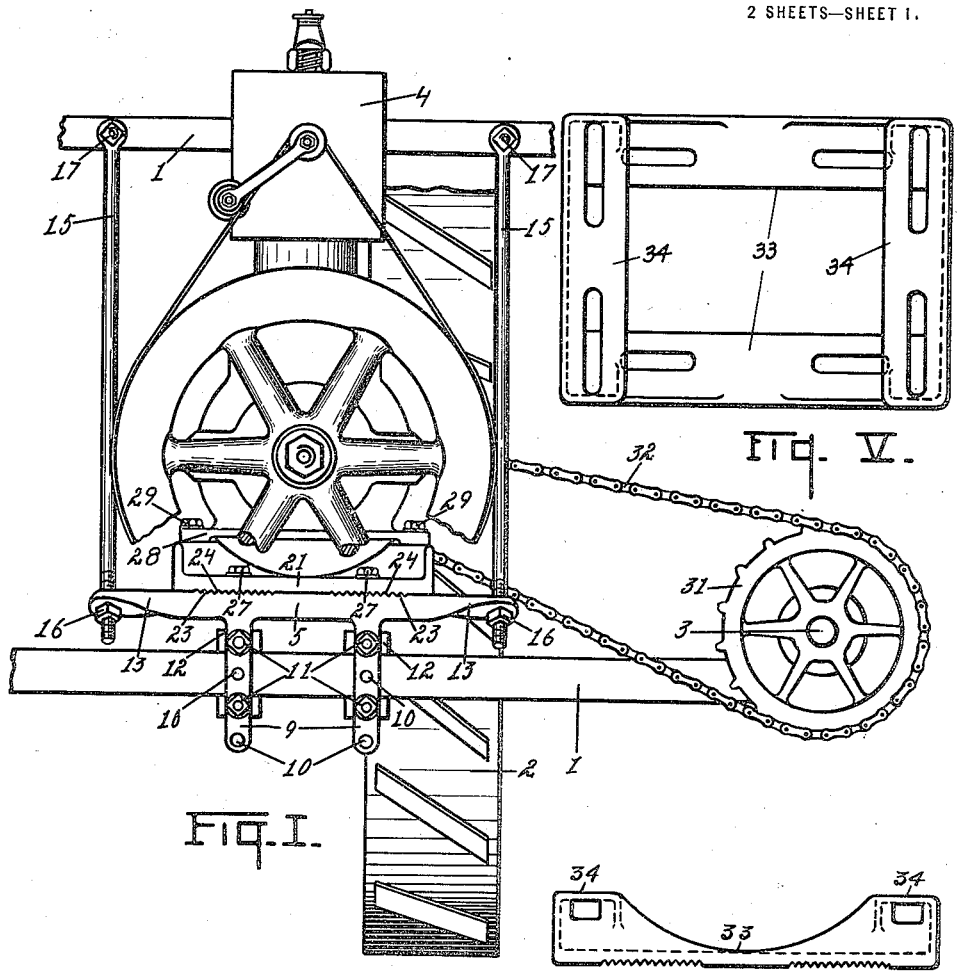
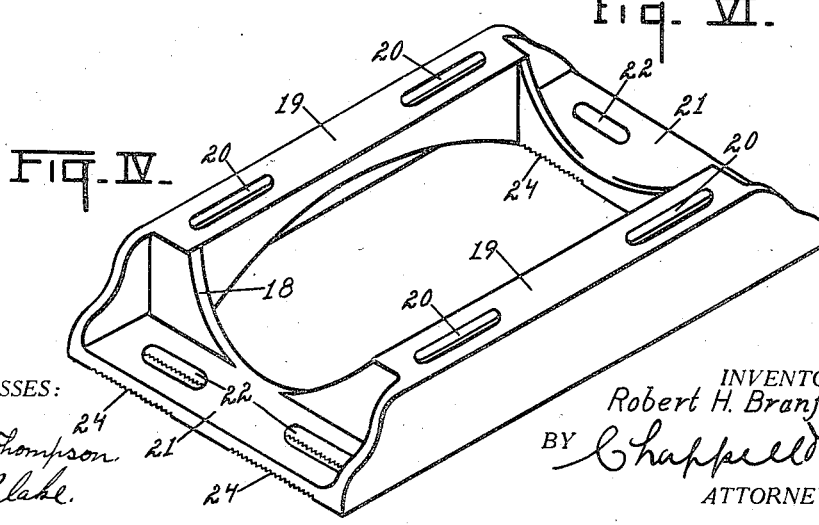
WITNESSES:
Grace B. Thompson
L. C. Blake
INVENTOR.
Robert H. Branfield.
BY Chappell Earl
ATTORNEYS.

R. H. BRANFIELD.
ENGINE MOUNTING.
APPLICATION FILED NOV. 6, 1915.
1,188,242.
Patented June 20, 1916.
2 SHEETS—SHEET 2.
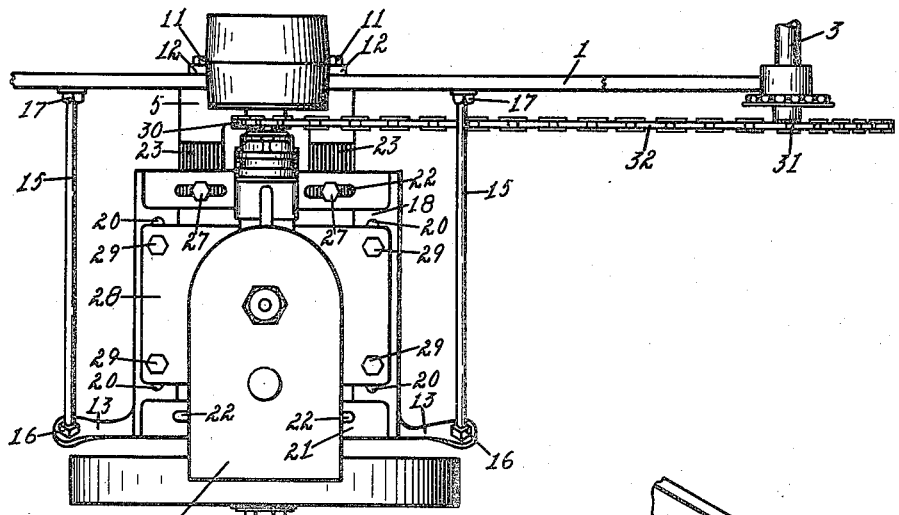
Fig. II.
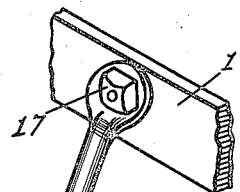
Fig. III.
WITNESSES:
Grace B. Thompson.
L. C. Blake.
INVENTOR.
Robert H. Branfield
BY Chappell & Earl
ATTORNEYS.

UNITED STATES PATENT OFFICE.

ROBERT H. BRANFIELD, OF LANSING, MICHIGAN, ASSIGNOR TO THE "NEW-WAY" MOTOR COMPANY, OF LANSING, MICHIGAN.

ENGINE-MOUNTING.

1,188,242.   Specification of Letters Patent.   Patented June 20, 1916.

Application filed November 6, 1915. Serial No. 60,079.

*To all whom it may concern:*

Be it known that I, ROBERT H. BRANFIELD, a citizen of the United States, residing at Lansing, Michigan, have invented certain new and useful Improvements in Engine-Mountings, of which the following is a specification.

This invention relates to improvements in engine mountings.

It has been found to be advantageous to mount an engine upon harvesting machines, such as grain binders, corn harvesters, potato diggers and the like, for the purpose of driving the mechanism thereof. The product of different manufacturers of harvesting machines, potato diggers and the like, differ considerably in frame structure and in arrangement of working parts. My improved engine mounting is especially designed by me for mounting an engine on such machines, although advantageous for use in other relations.

The main object of my invention is to provide an improved motor mounting by means of which an engine may be conveniently mounted on different makes of harvesting machines and on different types of harvesting machines, such as grain binders, corn harvesters, potato diggers and the like.

A further object is to provide an improved engine mounting having these advantages, which is simple and economical in its parts and one which renders it possible for an engine to be satisfactorily mounted by others than skilled mechanics or workmen.

Still further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail rear elevation of a harvesting machine to which my improved engine mounting has been applied. Fig. II is a detail plan view. Fig. III is a detail perspective view of the supporting bed with the parts of a harvesting machine frame shown in connection therewith to illustrate the manner of mounting the bed. Fig. IV is a perspective view of the engine subbase. Fig. V is a plan view of a modified form of engine subbase. Fig. VI is an elevation of the form of subbase shown in Fig. V.

In the drawing, similar reference characters refer to similar parts throughout the several views, and the sectional views are taken looking in the direction of the little arrows at the ends of the section lines.

Referring to the drawing, 1 represents the frame, 2 the bull wheel and 3 the binding mechanism driving shaft of a harvester. These parts are all shown in conventional form, as their structural details are unimportant so far as my present improvements are concerned. The motor 4 is also shown mainly in conventional form.

The bracket-like supporting bed member 5 is preferably frame-like, consisting of side portions 6, an inner end portion 7, and outer end portion 8. At its inner end the bed member is provided with downwardly projecting supporting arms having holes 10 therein adapted to receive the clamping bolts 11 for the clamp or clip plates 12 by means of which the bed member is adjustably secured to the frame of a harvester or the like machine upon which the motor is to be mounted. At its outer end the bed chamber is provided with laterally projecting arms 13 to which the supporting rods 15 are adjustably secured, the rods being threaded and provided with nuts 16. The upper ends of the rods are provided with eyes and are secured to the machine frame by means of bolts, as 17.

I provide an engine subbase, designated generally by the numeral 18. This subbase is preferably also frame-like and consists of raised side portions 19 having sets of longitudinal slots 20 therein and end portions 21 having sets of slots 22 therein. The subbase is adapted to rest on the bed member. The bed member is preferably provided with longitudinal serrations 23, while the end portions 21 of the subbase have coacting serrations 24. The side portions 6 of the bed member have bolt holes 25 registering with the slots 22 of the subbase. Bolts 27 are arranged through these holes 25 and slots 22 so that the subbase is secured to the bracket for lateral adjustment thereon. The engine 4 is provided with a base 28 adapted to rest on the subbase. The bolts 29 on the engine base engage the slots 20 of the subbase so that the engine is secured to the subbase for adjustment thereon. This enables the adjustment of the engine on its bed member either from front to rear thereof or laterally thereof. These adjustments permit the mounting of the engine on the frames of various forms of harvesting and other machines on which the engine is to be used and the adjustment of the engine to accommodate particular arrangements of parts of the frame and the driving connections of the machine so as to aline its driving sprocket 30 with the driven sprocket 31 on the driving shaft 3. The sprockets are connected by the chain 32. Any suitable driving connections may be used and the driving connections made to any desired part of the machine to be driven.

In the modification shown in Figs. V and VI the subbase is shortened by disposing the front and rear members 33 thereof so that the side members 34 overlap the same.

I have illustrated and described my improvements in detail in two forms in which I have embodied the same in use. I have not attempted to illustrate or describe various modifications which I contemplate as being desirable under certain conditions, as I believe the disclosure made will enable those skilled in the art to which my invention relates to embody or adapt my improvements as conditions may require.

Having thus described my invention, what I claim as new and desire to secure by Letters Patent, is:

1. In a structure of the class described, the combination with an engine provided with a base, a frame-like supporting bed member provided with attaching clamps at its inner end and supports at its outer end, the side portions of said bed member being provided with bolt holes and having longitudinal serrations in their upper sides, a frame-like subbase member having raised side portions with longitudinal slots therein and end portions with slots therein disposed transversely of the bed member and registering with said bolt holes thereof, the under sides of the end portions of said subbase member being serrated to coact with the serrations of said bed member, securing bolts for said subbase disposed through said bolt holes of said bed member and engaging the slots of said subbase end portions whereby the subbase is supported on said bed member for adjustment transversely thereof, and bolts on said engine base engaging said slots in the side portions of said subbase whereby the engine is adjustably secured thereto.

2. In a structure of the class described, the combination with an engine provided with a base, a frame-like supporting bed member provided with attaching clamps at its inner end and supports at its outer end, the side portions of said bed member being provided with bolt holes, a frame-like subbase member having slots in its side and end portions, securing bolts for said subbase disposed through said bolt holes of said bed member and engaging slots in said subbase whereby the subbase is supported on said bed member for adjustment, and bolts on said engine base engaging said slots in said subbase whereby the engine is adjustably secured thereto.

3. In a structure of the class described, the combination with an engine provided with a base, of a supporting bed member provided with attaching means, a subbase interposed between said engine base and bed member, said subbase being provided with sets of slots disposed at right angles to each other, bolts on said bed member coacting with one set of slots whereby said subbase member is supported for adjustment on said bed member, and bolts on said engine base coacting with the said set of slots whereby said engine is supported for adjustment on said subbase member.

4. In a structure of the class described, the combination with an engine provided with a base, a subbase on which said engine is mounted for adjustment in one direction, and a supporting bed member on which said subbase is mounted for adjustment at an angle to the direction of adjustment of said engine on said subbase.

5. In a structure of the class described, the combination with an engine, of a support therefor comprising a bed member, and an intermediate member mounted on said bed member for adjustment thereon in one direction, said engine being mounted on said intermediate member for adjustment thereon in a direction transverse to the direction of adjustment of said intermediate member.

In witness whereof, I have hereunto set my hand and seal in the presence of two witnesses.

ROBERT H. BRANFIELD. [L. S.]

Witnesses:
 E. W. GOODNOW,
 H. MAUTHEY.